US012804293B2

(12) United States Patent
Yanagimachi

(10) Patent No.: US 12,804,293 B2
(45) Date of Patent: Nov. 17, 2026

(54) MANAGEMENT APPARATUS, OPTICAL NODE APPARATUS, OPTICAL NETWORK SYSTEM, CONTROL METHOD, AND NON-TRANSITORY COMPUTER-READABLE MEDIUM

(71) Applicant: NEC Corporation, Tokyo (JP)

(72) Inventor: Shigeyuki Yanagimachi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 238 days.

(21) Appl. No.: 18/714,617

(22) PCT Filed: Dec. 8, 2021

(86) PCT No.: PCT/JP2021/045070
§ 371 (c)(1),
(2) Date: May 30, 2024

(87) PCT Pub. No.: WO2023/105669
PCT Pub. Date: Jun. 15, 2023

(65) Prior Publication Data
US 2025/0048008 A1 Feb. 6, 2025

(51) Int. Cl.
*H04Q 11/00* (2006.01)

(52) U.S. Cl.
CPC ..... *H04Q 11/0062* (2013.01); *H04Q 11/0005* (2013.01); *H04Q 2011/0011* (2013.01)

(58) Field of Classification Search
None
See application file for complete search history.

(56) References Cited

U.S. PATENT DOCUMENTS 8,625,994 B2 * 1/2014 Archambault ..... H04Q 11/0005 398/43
2006/0193638 A1 * 8/2006 Akiyama ........... H04B 10/2513 398/147

(Continued)

FOREIGN PATENT DOCUMENTS

JP 2003-304563 A 10/2003
JP 2003-318952 A 11/2003

(Continued)

OTHER PUBLICATIONS

International Search Report for PCT Application No. PCT/JP2021/045070, mailed on Mar. 8, 2022.

(Continued)

*Primary Examiner* — Darren E Wolf
(74) *Attorney, Agent, or Firm* — Sughrue Mion, PLLC

(57) ABSTRACT

A management apparatus (10) includes: a path management unit (11) configured to manage a wavelength resource that can be used in a path of a photonics network including a node that performs wavelength conversion through optical-analog-optical conversion and a usage state of the wavelength resource; a wavelength conversion management unit (12) configured to manage path wavelength conversion information that includes wavelength conversion at the node constituting the path; and a control unit (13) configured to control wavelength conversion at the node, based on the managed wavelength resource and usage state, and to control analog compensation at the node, based on the managed path wavelength conversion information.

10 Claims, 12 Drawing Sheets

(56) References Cited

U.S. PATENT DOCUMENTS

| | | | | |
|---|---|---|---|---|
| 2007/0014510 | A1 | 1/2007 | Kusama | |
| 2007/0172240 | A1* | 7/2007 | Terai | H04J 14/0212 398/83 |
| 2011/0076015 | A1 | 3/2011 | Kusama | |
| 2012/0301141 | A1 | 11/2012 | Sakamoto et al. | |
| 2018/0167142 | A1* | 6/2018 | Vassilieva | H04Q 11/0005 |
| 2018/0307119 | A1* | 10/2018 | Kato | G02B 6/272 |

FOREIGN PATENT DOCUMENTS

| | | | |
|---|---|---|---|
| JP | 2004-193974 | A | 7/2004 |
| JP | 2007-028144 | A | 2/2007 |
| JP | 2009-017148 | A | 1/2009 |
| JP | 2010-206539 | A | 9/2010 |
| JP | 2012-248958 | A | 12/2012 |
| JP | 2015-186230 | A | 10/2015 |
| JP | 2017-511036 | A | 4/2017 |

OTHER PUBLICATIONS

JP Official Communication for JP Application No. 2025-071514, mailed on Mar. 3, 2026 with English Translation.

* cited by examiner

MANAGEMENT APPARATUS, OPTICAL NODE APPARATUS, OPTICAL NETWORK SYSTEM, CONTROL METHOD, AND NON-TRANSITORY COMPUTER-READABLE MEDIUM

This application is a National Stage Entry of PCT/JP2021/045070 filed on Dec. 8, 2021, the contents of all of which are incorporated herein by reference, in their entirety.

TECHNICAL FIELD

The present invention relates to a management apparatus, an optical node apparatus, an optical network system, a control method, and a non-transitory computer-readable medium.

BACKGROUND ART

In recent years, traffic being flowed in a network continues to grow rapidly, due to a rapid spread of a mobile terminal represented by a smartphone and large-capacity data communication such as a high-definition image caused by advancement of the terminal. According to a certain survey, total download traffic of broadband subscribers in a domestic fiscal year of 2020 is about 19 Tbps and continues to increase at an annual rate of about 57%, and traffic is expected to further increase in the future. In response to this, in a core network supporting large-capacity communication, a technique for meeting a demand for an increase in capacity, such as a wavelength division multiplexing (WDM) technique, which transmits a plurality of optical signals having different wavelengths from one another by multiplexing such optical signals into a single optical fiber, or a high-level modulation scheme such as dual polarization differential quadrature phase shift keying (DP-QPSK) and 16-quadrature amplitude modulation (16-QAM) has been developed. Furthermore, along with development of a 5G service in wireless communication, there is an increasing demand not only for an increase in the capacity but also for a reduction in delay of the network. In response to such needs, in recent years, an innovative optical and wireless network (IOWN) initiative being led by NTT has proposed an all-photonics network that achieves a network with greater capacity and less delay. Unlike a network including electrical conversion at an associated switching node, the all-photonics network performs transmission by an optical means in all paths. For this reason, it is possible not only to perform large-capacity communication without limitation caused by a capacity of an electric switch, but also to reduce delay, due to being free from delay accompanying electrical conversion.

However, since same wavelengths cannot be used in an optical fiber, there is a problem that a path of the same wavelength coming from a different route to a switching node cannot be accommodated in the same fiber and thereby efficient path control cannot be performed. For such a problem, a method for switching wavelengths by using a wavelength converter and accommodating the wavelengths in the same fiber is adopted in the switching node.

Further, Patent Literatures 1 and 2, for example, are known as techniques related to signal quality in an optical network. Patent Literature 1 discloses a polarization dependent loss (PDL) compensation technique, and Patent Literature 2 discloses a dispersion compensation technique.

CITATION LIST

Patent Literature

Patent Literature 1: Japanese Unexamined Patent Application Publication No. 2015-186230

Patent Literature 2: Japanese Unexamined Patent Application Publication No. 2010-206539

SUMMARY OF INVENTION

Technical Problem

However, conventional related techniques do not consider wavelength conversion to be applied in an all-photonics network, and hence it is difficult to effectively suppress deterioration in signal quality in a path.

In consideration of the above-described problems, an object of the present disclosure is to provide a management apparatus, an optical node apparatus, an optical network system, a control method, and a non-transitory computer-readable medium that are capable of effectively suppressing deterioration in signal quality.

Solution to Problem

A management apparatus according to the present disclosure includes: a path management means for managing a wavelength resource that can be used in a path of an all-photonics network provided with an optical node apparatus configured to perform wavelength conversion through optical-analog-optical conversion and a usage state of the wavelength resource; a wavelength conversion management means for managing path wavelength conversion information including wavelength conversion at the optical node apparatus constituting the path; and a control means for controlling wavelength conversion at the optical node apparatus, based on the managed wavelength resource and usage state, and controlling analog compensation at the optical node apparatus, based on the managed path wavelength conversion information.

An optical node apparatus according to the present disclosure is an optical node apparatus that constitutes an all-photonics network, and includes: an optical reception means for receiving an optical signal; a wavelength conversion means for performing wavelength conversion on the received optical signal through optical-analog-optical conversion; an optical transmission means for transmitting the wavelength-converted optical signal; and a node control means for controlling the wavelength conversion means in such a way as to perform wavelength conversion and analog compensation in response to a notification from a management apparatus managing the all-photonics network.

An optical network system according to the present disclosure includes: an all-photonics network provided with an optical node apparatus configured to perform wavelength conversion through optical-analog-optical conversion; and a management apparatus configured to manage the all-photonics network, wherein the management apparatus includes a path management means for managing a wavelength resource that can be used in a path of the all-photonics network and a usage state of the wavelength resource, a wavelength conversion management means for managing path wavelength conversion information including wavelength conversion at the optical node apparatus constituting the path, and a control means for controlling wavelength conversion at the optical node apparatus, based on the managed wavelength resource and usage state, and controlling analog compensation at the optical node apparatus, based on the managed path wavelength conversion information.

A control method according to the present disclosure includes: managing a wavelength resource that can be used in a path of an all-photonics network provided with an optical node apparatus configured to perform wavelength conversion through optical-analog-optical conversion and a usage state of the wavelength resource; managing path wavelength conversion information including wavelength conversion at the optical node apparatus constituting the path; and controlling wavelength conversion at the optical node apparatus, based on the managed wavelength resource and usage state, and controlling analog compensation at the optical node apparatus, based on the managed path wavelength conversion information.

A non-transitory computer-readable medium storing a control program according to the present disclosure is a non-transitory computer-readable medium storing a control program for causing a computer to execute processing of: managing a wavelength resource that can be used in a path of an all-photonics network provided with an optical node apparatus configured to perform wavelength conversion through optical-analog-optical conversion and a usage state of the wavelength resource; managing path wavelength conversion information including wavelength conversion at the optical node apparatus constituting the path; and controlling wavelength conversion at the optical node apparatus, based on the managed wavelength resource and usage state, and controlling analog compensation at the optical node apparatus, based on the managed path wavelength conversion information.

Advantageous Effects of Invention

According to the present disclosure, it is possible to provide a management apparatus, an optical node apparatus, an optical network system, a control method, and a non-transitory computer-readable medium that are capable of effectively suppressing deterioration in signal quality.

EXAMPLE EMBODIMENT

Figure 1:
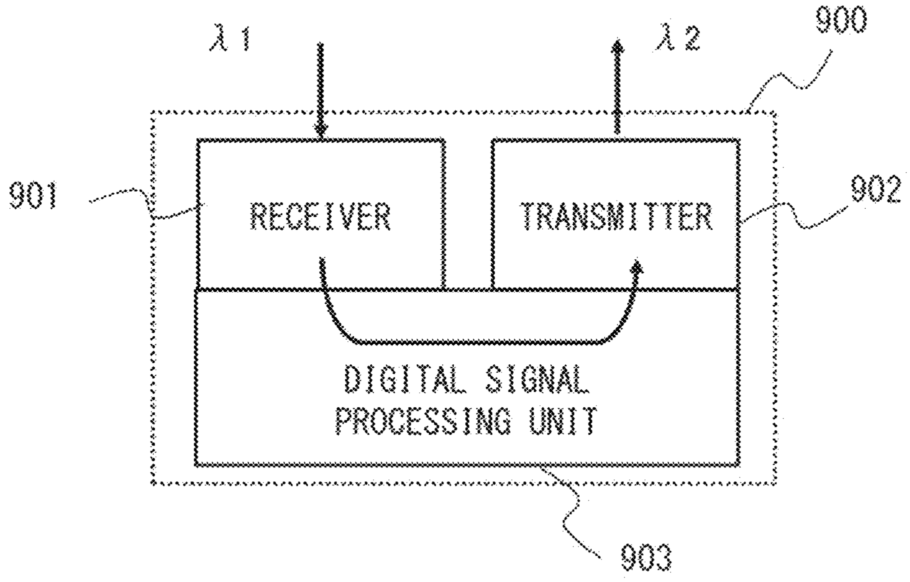
FIG. 1 is a functional block diagram illustrating a configuration of a wavelength converter according to an examination example.

Hereinafter, example embodiments are described with reference to the drawings. In the drawings, the same element is denoted by the same reference sign, and redundant descriptions are omitted as necessary.

Examination Leading to Example Embodiments

As described above, at a node in an all-photonics network, wavelength conversion is performed as necessary by a wavelength converter. As a wavelength conversion method, all-optical wavelength conversion utilizing nonlinearity of light, wavelength conversion utilizing transponder function, and the like are proposed or being used. In the all-optical wavelength conversion, there is an advantage that the delay is small since wavelength conversion is performed thoroughly in the form of light, but there are problems that, for example, an optical loss of a wavelength conversion device is large and the transmittable distance is limited.

A functional block of a wavelength converter utilizing a transponder function is illustrated in FIG. 1. As illustrated in FIG. 1, a wavelength converter 900 according to an examination example includes a receiver 901, a transmitter 902, and a digital signal processing unit 903. The receiver 901 receives an optical signal of a first wavelength (λ1), the digital signal processing unit 903 turns around the optical signal, and the transmitter 902 transmits an optical signal of a second wavelength (λ2). Thus, the wavelength of the optical signal is converted from λ1 to λ2. In the wavelength converter 900, since complete waveform molding is performed by so-called 3R (re-amplification (amplification), re-shaping (waveform shaping), and re-timing (bit-spacing adjustment)) regeneration via the digital signal processing unit 903, there is no limitation on the transmission range, but there is a problem that a delay occurs in the digital signal processing unit 903.

Figure 2:
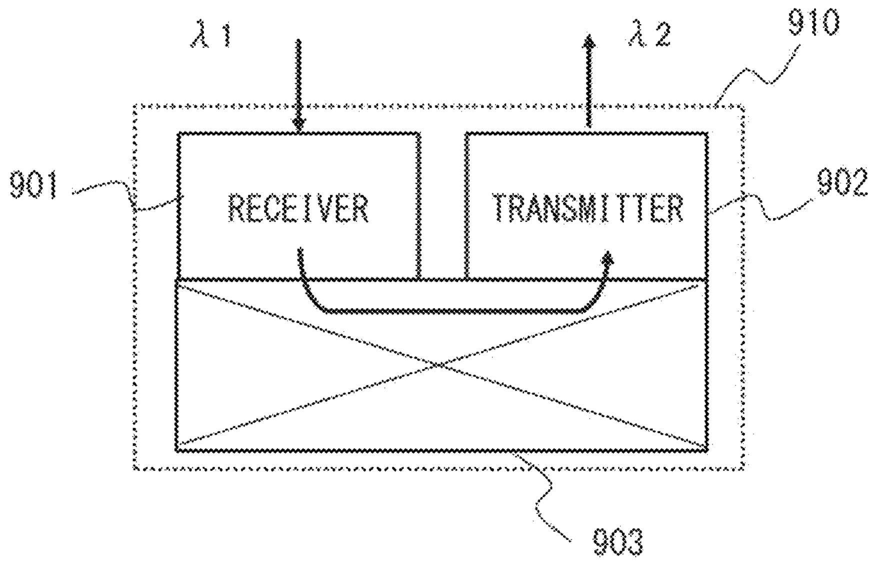
FIG. 2 is a functional block diagram illustrating a configuration of another wavelength converter according to the examination example.

Therefore, a configuration in which an analog electric signal between a transmitter and a receiver is turned around without passing through a digital signal processing unit is examined (hereinafter, wavelength conversion by such a configuration is referred to as an O-A-O (optical-analog-optical) wavelength conversion). The functional block of the present configuration is illustrated in FIG. 2. As illustrated in FIG. 2, another wavelength converter 910 according to the examination example includes a receiver 901 and a transmitter 902, similarly to the wavelength converter 900, but does not require the digital signal processing unit 903. That is, in the another wavelength converter 910, an analog electric signal output from the receiver 901 is directly turned around to the transmitter 902 without passing through the digital signal processing unit 903.

In the present configuration, since digital signal processing is not performed, a different function of compensating for signal deterioration accumulated in a transmission line of a past route needs to be added. For example, there are methods such as, as illustrated in FIG. 3, correcting a band by providing an analog signal processing unit 913 between a coherent reception front-end 911 and a coherent transmission front-end 912.

Figure 3:
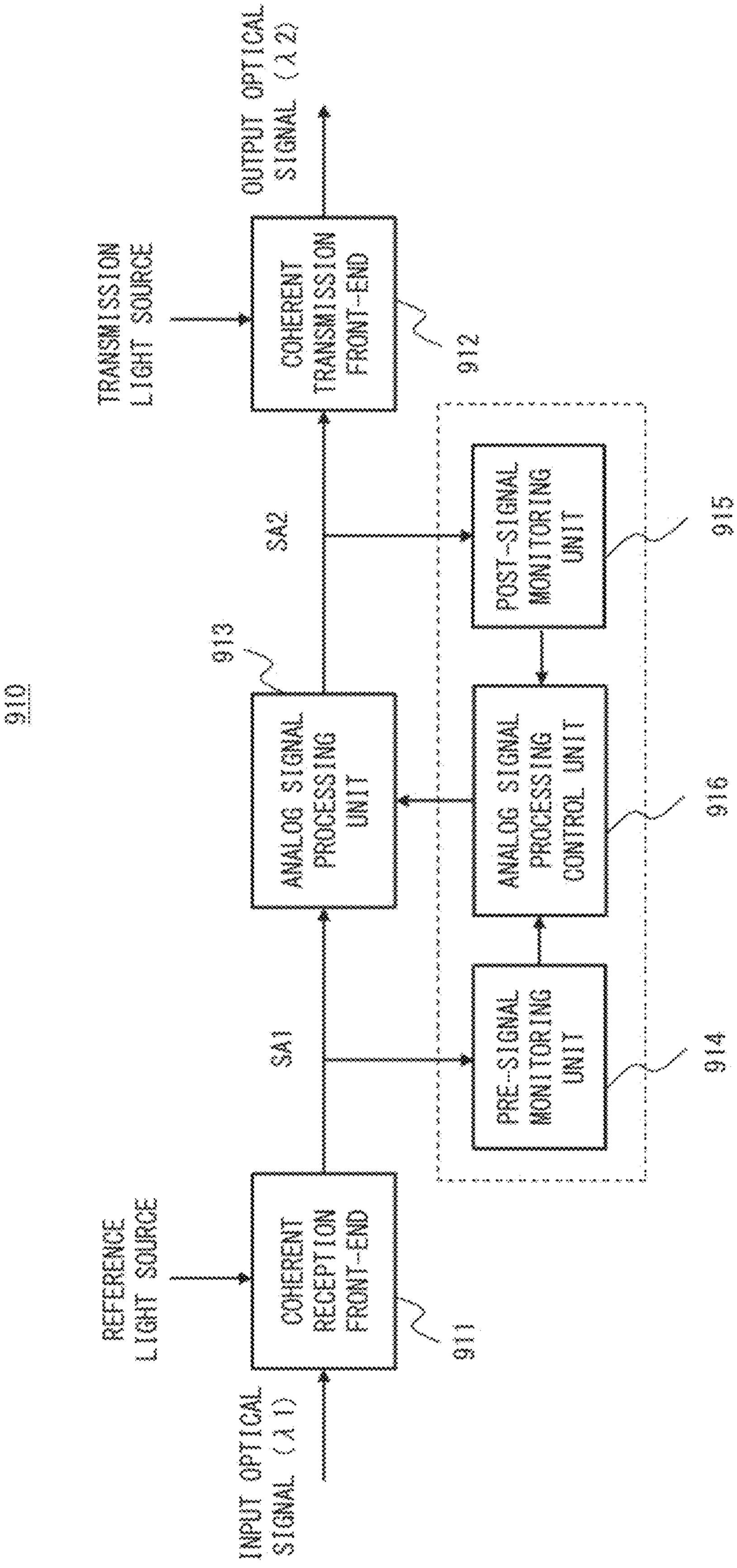
FIG. 3 is a functional block diagram illustrating a specific configuration example of the another wavelength converter according to the examination example.

In the example of FIG. 3, the another wavelength converter 910 includes the coherent reception front-end 911, the coherent transmission front-end 912, and the analog signal processing unit 913. The coherent reception front-end 911 is an optical-to-electrical converter, and coherently detects an input optical signal (λ1) to be input, based on a reference light source (local oscillator (LO) light), and outputs an analog electric signal SA1 generated by the detection. The coherent transmission front-end 912 is an electrical-to-optical converter, and coherently modulates an analog electric signal SA2 generated by turning around the analog electric signal SA1, based on a transmission light source, and outputs an output optical signal (λ2) generated by the modulation. For example, the wavelength of the output optical signal may be converted from λ1 to λ2 according to the wavelength of the transmission light source. The analog signal processing unit 913 is an analog circuit that performs analog signal processing on the analog electric signal SA1 in such a way as to compensate for signal quality and generates the analog electric signal SA2. The analog signal processing is analog compensation processing, and compensates for, for example, passband narrowing and the like.

Further, as illustrated in FIG. 3, in order to control the analog compensation processing, the another wavelength converter 910 may include a pre-signal monitoring unit 914, a post-signal monitoring unit 915, and an analog signal processing control unit 916. The pre-signal monitoring unit 914 monitors the signal characteristics of the analog electric signal SA1 before the analog signal processing. The post-signal monitoring unit 915 monitors the signal characteristics of the analog electric signal SA2 after the analog signal processing. The analog signal processing control unit 916 controls the operation of the analog signal processing of the analog signal processing unit 913, based on the monitoring result of the pre-signal monitoring unit 914 or the post-signal monitoring unit 915. For example, the passband of the analog electric signal SA1 or the analog electric signal SA2 is monitored, and a passband adjustment amount in the analog signal processing unit 913 is controlled, based on the monitoring result.

Figure 4:
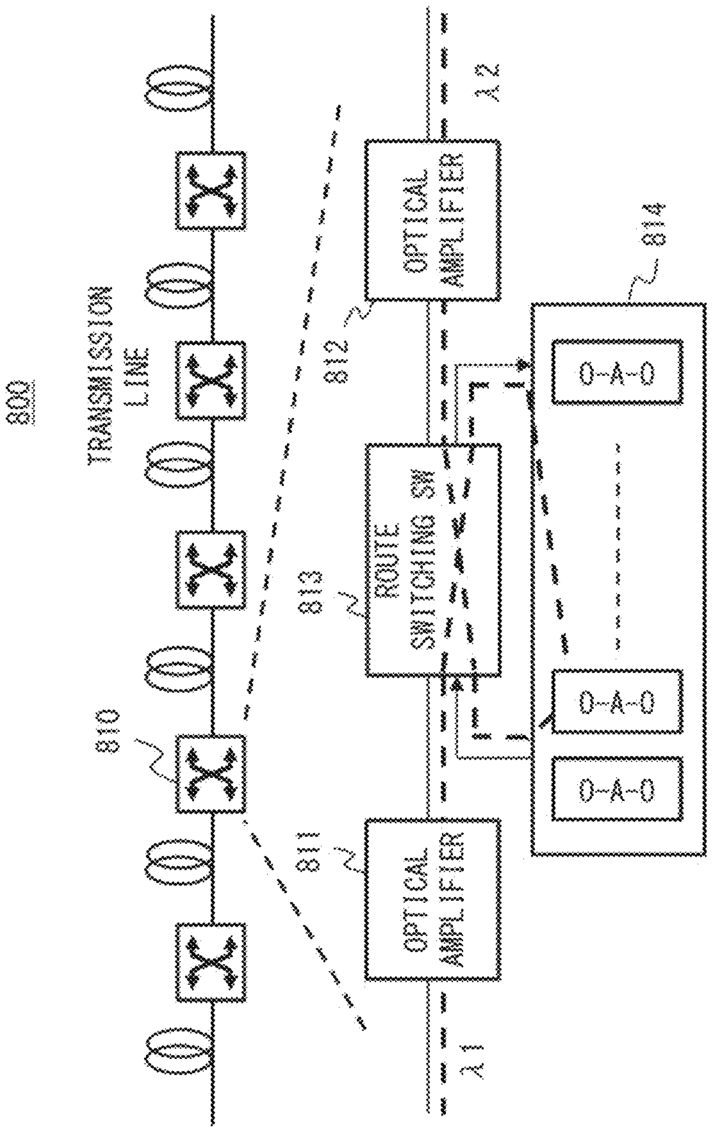
FIG. 4 is a configuration diagram illustrating a configuration of an all-photonics network according to the examination example.

FIG. 4 illustrates a configuration of an all-photonics network using an O-A-O conversion and a node according to the examination example. In FIG. 4, the network configuration is illustrated as a configuration having a single, straight transmission line for simplicity. That is, as illustrated in FIG. 4, an all-photonics network 800 according to the examination example includes a plurality of nodes 810, and the nodes 810 are connected to each other via an optical transmission line.

Each of the nodes 810 includes optical amplifiers 811 and 812 for compensating for a transmission loss, a route changeover switch 813, and an O-A-O wavelength converter pool 814 having a plurality of O-A-O wavelength converters mounted therein. The route changeover switch 813 is connected between the optical amplifier 811 and the optical amplifier 812, and the route changeover switch 813 switches the route of the path to the O-A-O wavelength converter pool 814 as necessary. After the path requiring wavelength conversion is connected to the O-A-O wavelength converter pool 814, the wavelength is converted from λ1 to λ2, for example, and sent to the optical transmission line.

Figure 5:
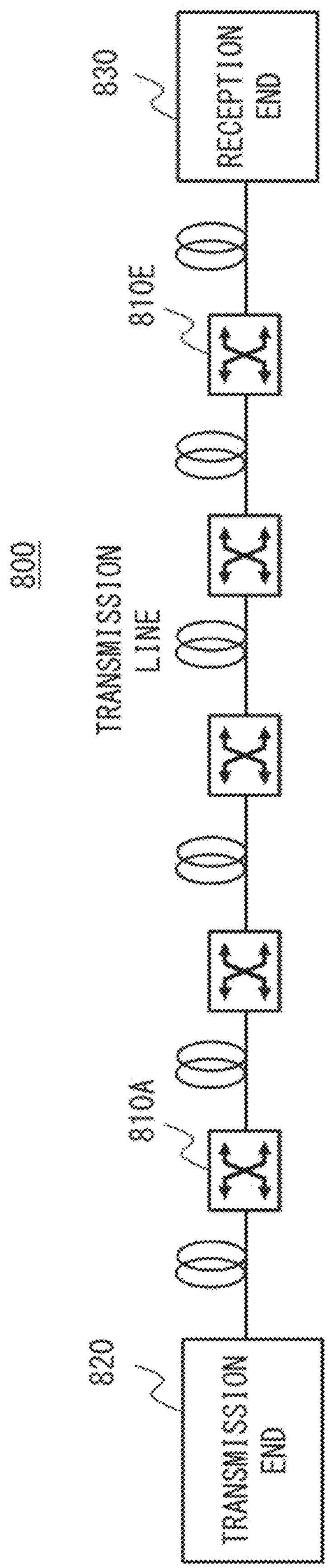
FIG. 5 is a diagram for describing a problem in the all-photonics network according to the examination example.

However, in an existing network, although the network range (for example, within 10 hops) is designed in advance in such a way that arrival is guaranteed regardless of the assignment of any wavelength to any path, when O-A-O wavelength conversion is installed in the network, signal quality varies depending on the location (where to be installed between the transmission node and the reception node) of the wavelength conversion, and thus it is difficult to guarantee the arrival. For example, as illustrated in FIG. 5, in a case where O-A-O wavelength conversion is performed at a node 810A, the effect of analog compensation is small since the node 810A is close to the transmission end 820 and signal deterioration has not proceeded much, and further, since the remaining transmission line is long, there is a possibility that the reception sensitivity may fall below the minimum reception sensitivity midway. In a case where wavelength conversion is performed at a node 810E being close to a reception end 830, although arrival to the node 810E is guaranteed, there is a possibility that the reception sensitivity may fall below the minimum reception sensitivity since signal-to-noise ratio (S/N) deterioration proceeds when analog compensation is performed on a deteriorated signal having low S/N.

In addition, in the network, devices having wavelength characteristics such as an optical amplifier are present, characterized by, for example, poor noise figure (NF) characteristics at short wavelengths. Therefore, the characteristics may change depending on the wavelength before wavelength conversion and the wavelength after wavelength conversion at the time of wavelength conversion. For example, in a case of converting from a short wavelength to a short wavelength, the characteristics may be deteriorated as compared with a case of converting from a long wavelength to a long wavelength.

As described above, as related techniques, a large number of analog compensation techniques have been disclosed, such as an analog PDL compensation technique disclosed in Patent Literature 1 and an analog dispersion compensation technique in Patent Literature 2. However, conventional analog compensation techniques are not designed on the assumption that an O-A-O wavelength conversion is to be arranged, and it is necessary to separately consider the network control considering the location of the wavelength conversion as described above. Therefore, the example embodiments are made in view of the above-described problem.

Specifically, two main problems are considered. The first problem is that it is difficult to guarantee the arrival in a path in an all-photonics network using O-A-O wavelength conversion. The reason is that signal quality varies depending on the location (where to be installed between a transmission node and a reception node) of the wavelength conversion.

The second problem is that, in an all-photonics network using O-A-O wavelength conversion, the path arrival guarantee cannot be made uniform. The reason is that there are devices having wavelength characteristics such as an optical amplifier, and the quality of the path depends on the wavelengths before and after the wavelength conversion. Therefore, in the example embodiments, a control method in an optical network that uses analog wavelength conversion is provided, and in particular, a method for ensuring the arrival guarantee in a path is provided.

Summary of Example Embodiments

Figure 6:
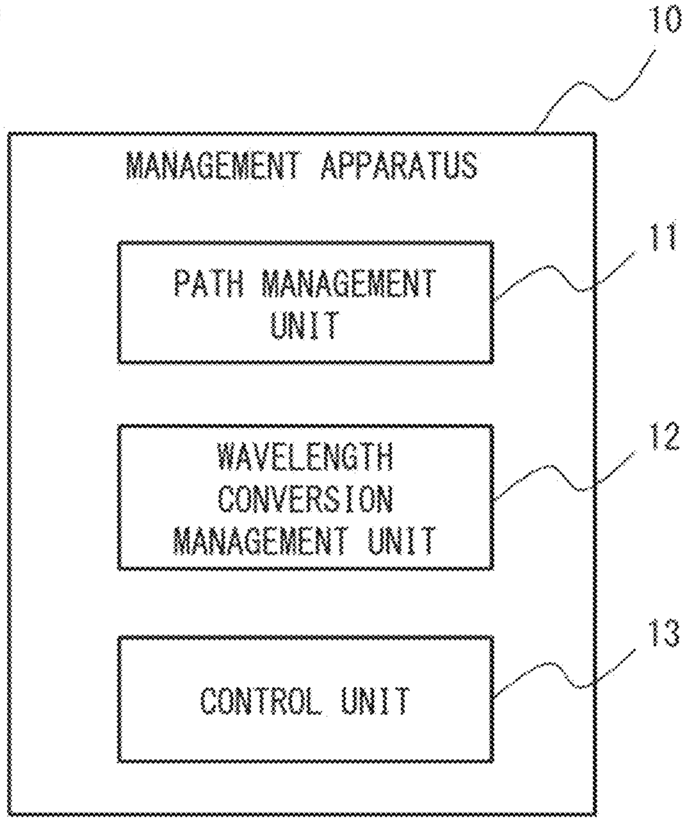
FIG. 6 is a functional block diagram illustrating an outline configuration of a management apparatus according to example embodiments.
Figure 7:
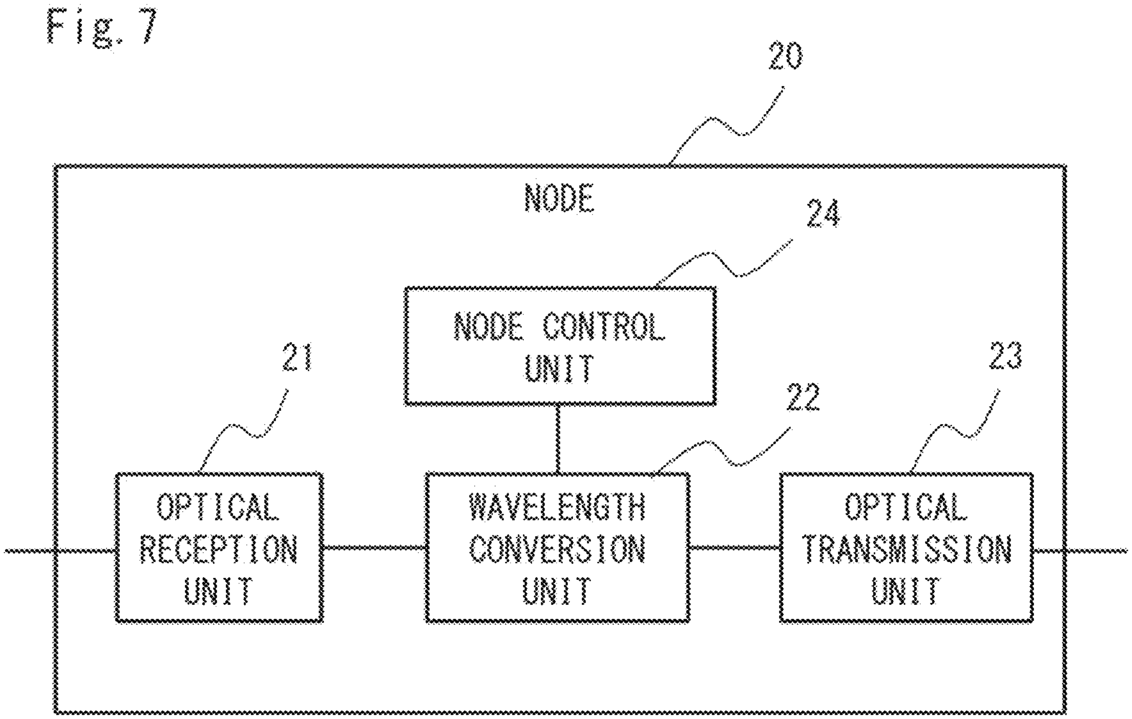
FIG. 7 is a functional block diagram illustrating an outline configuration of a node according to the example embodiments.

FIG. 6 illustrates an outline configuration of a management apparatus according to the example embodiments, and FIG. 7 illustrates an outline configuration of a node according to the example embodiments.

A node 20 is an optical node apparatus that performs wavelength conversion through O-A-O conversion (optical-analog-optical conversion), and constitutes an all-photonics network. A management apparatus 10 manages and controls the all-photonics network including the node 20. For example, the management apparatus 10 is a network management system (NMS) that manages a network.

As illustrated in FIG. 6, the management apparatus 10 includes a path management unit 11, a wavelength conversion management unit 12, and a control unit 13. The path management unit 11 manages a wavelength resource that may be used in a path of the all-photonics network and a usage state of the wavelength resource. The path management unit 11 is, for example, a path database that manages and holds wavelength resources (information) and usage states (information).

The wavelength conversion management unit 12 manages the path wavelength conversion information including wavelength conversion at the node 20 constituting the path. The wavelength conversion management unit 12 is, for example, a wavelength conversion management database that manages and holds the path wavelength conversion information.

The control unit 13 controls the wavelength conversion at the node 20, based on the wavelength resource and usage state managed by the path management unit 11, and also controls analog compensation at the node 20, based on the path wavelength conversion information managed by the wavelength conversion management unit 12. For example, the control unit 13 may notify the node 20 of the path wavelength conversion information, and thereby control the node 20 to perform analog compensation on all the paths that are wavelength-converted in a route before the node 20.

In addition, wavelength conversion characteristics information including a transmission distance before the wavelength conversion, a transmission distance after the wavelength conversion, an estimated signal deterioration degree, and analog compensation node identification information may be further managed. In such a case, the control unit 13 may determine a candidate for a path for performing analog compensation, based on the wavelength conversion characteristics information, and control the node 20 to perform analog compensation on the determined path. Further, the control unit 13 may divide the entire wavelength band into a plurality of sections, and control in such a way that wavelength conversion is performed in such a way as to average the noise figure (NF) characteristics.

As illustrated in FIG. 7, the node 20 includes an optical reception unit 21, a wavelength conversion unit 22, an optical transmission unit 23, and a node control unit 24. The optical reception unit 21 receives an optical signal from an optical transmission line. The wavelength conversion unit 22 performs wavelength conversion by O-A-O wavelength conversion, on the optical signal received by the optical reception unit 21. The optical transmission unit 23 transmits the optical signal wavelength-converted by the wavelength conversion unit 22 to the optical transmission line.

In response to the notification from the management apparatus 10, the node control unit 24 performs control in such a way that the wavelength conversion unit 22 performs wavelength conversion and analog compensation. For example, the node control unit 24 may monitor all the paths wavelength-converted in the route before the node 20 in accordance with the path wavelength conversion information notified from the management apparatus 10, and may perform control in such a way as to perform analog compensation, based on a monitoring result. Further, the node control unit 24 may perform control in such a way that analog compensation is performed on a relevant path, based on information about a path to be subjected to analog compensation notified from the management apparatus 10.

With such a configuration, it is possible to effectively suppress deterioration in the signal quality of a path in an all-photonics network using O-A-O wavelength conversion. That is, as a first effect, it is possible to guarantee arrival of the path, due to a node in a path subjected to wavelength conversion appropriately performing analog compensation. Further, as a second effect, it is possible to uniformize the arrival guarantee of the path by performing wavelength conversion in such a way that the NF characteristics are averaged.

First Example Embodiment

Next, a first example embodiment is described. In the present example embodiment, an example is described in which, in a node, all paths that are wavelength-converted in a route before the node are monitored and analog compensation is performed.

<System Configuration>

Figure 8:
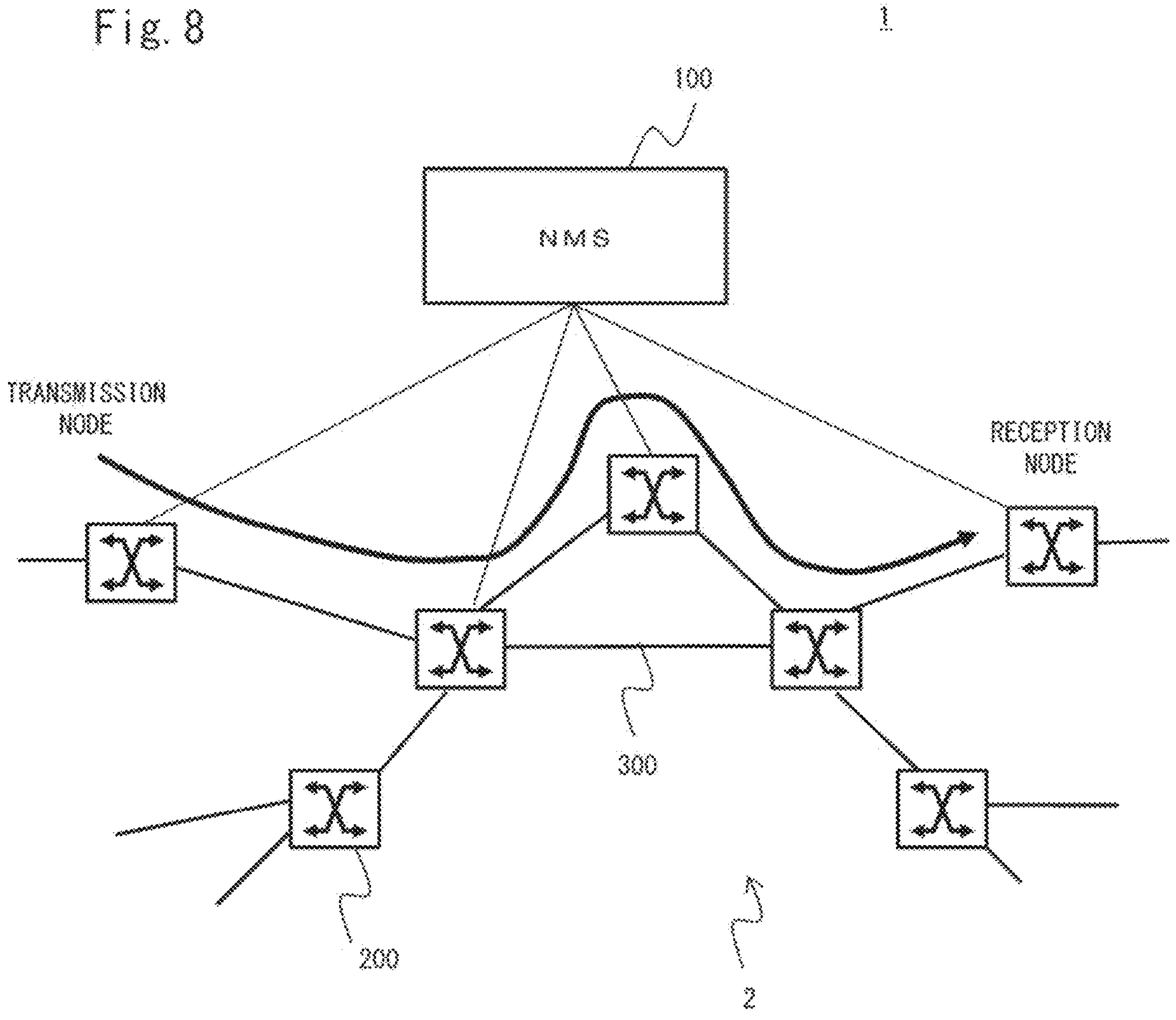
FIG. 8 is a configuration diagram illustrating a configuration example of an optical network system according to a first example embodiment.

First, the configuration of the present example embodiment is described with reference to FIGS. 8 and 9. FIG. 8 illustrates a configuration example of an optical network system according to the present example embodiment. As illustrated in FIG. 8, an optical network system 1 according to the present example embodiment includes an NMS 100 and a plurality of nodes 200. The plurality of nodes 200 are connected to each other via an optical transmission line 300 in such a way as to be capable of optical communication. The plurality of nodes 200 and the NMS 100 are also connected to each other via, for example, the optical transmission line 300, but may be communicably connected to each other via any other transmission line.

The plurality of nodes 200 are optical communication apparatuses that perform O-A-O wavelength conversion. That is, the plurality of nodes 200 constitute an all-photonics network 2 using O-A-O wavelength conversion. In the example of FIG. 8, the plurality of nodes 200 constitute a mesh-shaped network, but may constitute another form of network such as a ring shape. Further, the plurality of nodes 200 constitute a path from a transmission node (transmission end) to a reception node (reception end) in accordance with control from the NMS 100, and transmit data (optical signal) on the route of the path.

The NMS 100 is a management apparatus that manages and controls the all-photonics network 2 including the plurality of nodes 200. The NMS 100 manages and controls a path configured by the node 200 in the all-photonics network 2. The NMS 100 manages the route and wavelength of the path from the transmission node to the reception node, and sets the route and wavelength for the node 200 on the path.

Figure 9:
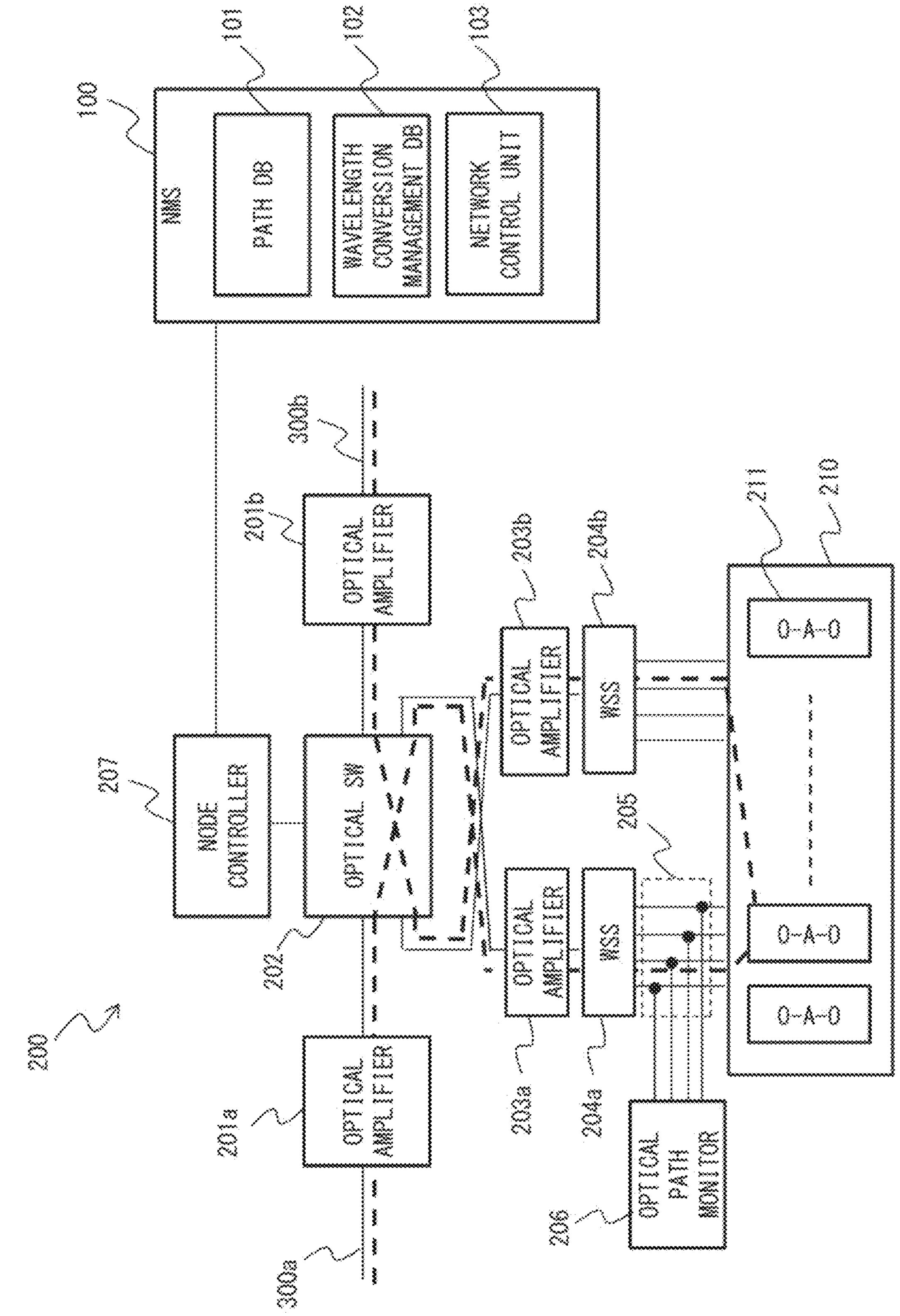
FIG. 9 is a functional block diagram illustrating a configuration example of each apparatus in the optical network system according to the first example embodiment.

FIG. 9 illustrates a configuration example of each apparatus in the optical network system according to the present example embodiment. As illustrated in FIG. 9, the NMS 100 includes a path database (DB) 101, a wavelength conversion management database (DB) 102, and a network control unit 103.

The path database 101 manages the path of the plurality of nodes 200 of the all-photonics network 2, and manages and holds a wavelength resource (wavelength resource information) that may be used in the paths and usage state (usage state information) of the wavelength resource. The path database 101 holds the wavelength resource and usage state in each node 200 constituting the path. The wavelength resource (wavelength resource information) indicates all wavelengths that may be used in the path, and the usage state (usage state information) indicates the wavelength being used in the path.

The wavelength conversion management database 102 manages and holds wavelength conversion by the nodes 200 constituting the path. The wavelength conversion management database 102 holds the wavelength conversion information regarding each node 200 constituting the path. The wavelength conversion information is information capable of identifying the wavelength conversion at each node 200 on the route of the path, and may indicate, for example, the presence or absence of the wavelength conversion in each node 200, the wavelength before and after the conversion in each node, and the like.

The network control unit 103 refers to the path database 101 and the wavelength conversion management database 102, and controls the path and the nodes 200 constituting the path. The network control unit 103 performs wavelength conversion of a path requiring wavelength conversion, based on the wavelength resource and usage state in the path database 101. That is, the network control unit 103 instructs each node 200 on the path to perform the wavelength conversion of the path as necessary, and holds wavelength conversion information indicating a result of the wavelength conversion in the wavelength conversion management database 102. In addition, the network control unit 103 notifies all the nodes 200 of the wavelength conversion information about all the paths in the wavelength conversion management database 102.

Further, the node 200 includes a transmission loss compensation optical amplifier 201 (201*a* and 201*b*), an optical switch (SW) 202, a node loss compensation optical amplifier 203 (203*a* and 203*b*), a wavelength selective switch (WSS) 204 (204*a* and 204*b*), a tap coupler 205, an optical path monitor 206, an analog wavelength converter pool 210, and a node controller 207.

The transmission loss compensation optical amplifier 201 is an optical amplifier that compensates for transmission loss occurring in an optical fiber by amplifying an optical signal. The transmission loss compensation optical amplifier 201*a* is a reception amplifier that receives an optical signal. The transmission loss compensation optical amplifier 201*a* receives an optical signal in fiber units from an adjacent node on the transmission node side via an input optical fiber 300*a*, and compensates for the transmission loss of the input optical fiber 300*a* in fiber units. The transmission loss compensation optical amplifier 201*a* outputs the optical signal after the transmission loss compensation to the optical switch 202.

The transmission loss compensation optical amplifier 201*b* is a transmission amplifier that transmits an optical signal. The transmission loss compensation optical amplifier 201*b* compensates for the transmission loss of the optical signal from the optical switch 202 in fiber units. The transmission loss compensation optical amplifier 201*b* outputs the optical signal in fiber units after the transmission loss compensation to an adjacent node on the reception node side via an output optical fiber 300*b*.

The optical switch 202 is an optical switch capable of switching a route of an optical signal in wavelength units. The optical switch 202 is connected between the transmission loss compensation optical amplifier 201*a* on the reception side and the transmission loss compensation optical amplifier 201*b* on the transmission side. The optical switch 202 switches add/drop of a predetermined optical signal (path) in accordance with control from the node controller 207. The optical switch 202 performs switching in wavelength units on the optical signal in fiber units from the transmission loss compensation optical amplifier 201*a*, and outputs the optical signal of a wavelength to be dropped to the node loss compensation optical amplifier 203*a* via a wavelength conversion port. Further, the optical switch 202 receives, through the analog wavelength converter pool 210, an optical signal from the node loss compensation optical amplifier 203*b* via the wavelength conversion port, performs switching in wavelength units on the received optical signal in fiber units, and outputs the optical signal of a wavelength to be added to the transmission loss compensation optical amplifier 201*b*.

The node loss compensation optical amplifier 203 is an optical amplifier that compensates for a loss occurring at a node by amplifying an optical signal. The node loss compensation optical amplifier 203*a* on the reception side (drop side) compensates for the loss of the optical signal in fiber units from the wavelength conversion port of the optical switch 202, and outputs the optical signal after the loss compensation to the wavelength switch 204*a*. The node loss compensation optical amplifier 203*b* on the transmission side (add side) compensates for the loss of the optical signal in fiber units from the wavelength switch 204*b* through the analog wavelength converter pool 210, and outputs the optical signal after the loss compensation to the wavelength conversion port of the optical switch 202.

The wavelength switch 204 is an optical switch capable of switching a route of an optical signal in wavelength units. The reception-side wavelength switch 204*a* separates in wavelength units the optical signal in fiber units from the node loss compensation optical amplifier 203*a*, and outputs the separated optical signal to an O-A-O wavelength converter 211 in the analog wavelength converter pool 210. The transmission-side wavelength switch 204*b* bundles in fiber units the optical signals in wavelength units from the O-A-O wavelength converter 211 in the analog wavelength converter pool 210, and outputs the optical signals in fiber units to the node loss compensation optical amplifier 203*b*.

The tap coupler 205 taps some or all of the optical signals in wavelength units output from the wavelength switch 204*a* on the reception side. The optical path monitor 206 monitors the quality of the optical signal tapped by the tap coupler 205. In response to control from the node controller 207, the tap coupler 205 taps a predetermined optical signal, and the optical path monitor 206 monitors the tapped optical signal.

The analog wavelength converter pool 210 includes a plurality of O-A-O wavelength converters 211. The plurality of O-A-O wavelength converters 211 are provided in association with the wavelength of input optical signals and the wavelength of output optical signals. The O-A-O wavelength converter 211 is a wavelength converter capable of performing O-A-O wavelength conversion and performing analog compensation. The O-A-O wavelength converter 211 includes, for example, a coherent reception front-end, a coherent transmission front-end, and an analog signal processing unit (analog compensator) as illustrated in FIG. 3, but may have other configurations as long as O-A-O wavelength conversion is possible. The O-A-O wavelength converter 211 performs analog compensation or wavelength conversion and analog compensation, on the optical signal in wavelength units from the wavelength switch 204*a* according to control from the node controller 207, and outputs the optical signal subjected to wavelength conversion or analog compensation to the wavelength switch 204*b*.

For example, as an analog compensator in the O-A-O wavelength converter 211, a compensator that performs band compensation, PDL compensation, dispersion compensation, and the like is installed. The optical path monitor 206 differs depending on the configuration of the analog compensator, and is, for example, a spectrum analyzer in a case where band compensation is performed, a PDL monitor in a case where PDL compensation is performed, and a dispersion monitor in a case where dispersion compensation is performed.

The node controller 207 controls each device in the node 200. The node controller 207 controls the operation of each device under the control of the NMS 100. Upon receiving a wavelength conversion instruction from the NMS 100, the node controller 207 controls the optical switch 202 to switch the relevant wavelength, and controls the O-A-O wavelength converter 211 to convert the wavelength. Upon receiving the wavelength conversion information about all the paths from the NMS 100, the node controller 207 determines a path (wavelength) to be monitored, and controls analog compensation of the corresponding O-A-O wavelength converter 211, based on a result of monitoring performed by the tap coupler 205 and the optical path monitor 206.

<System Operation>

Figure 10:
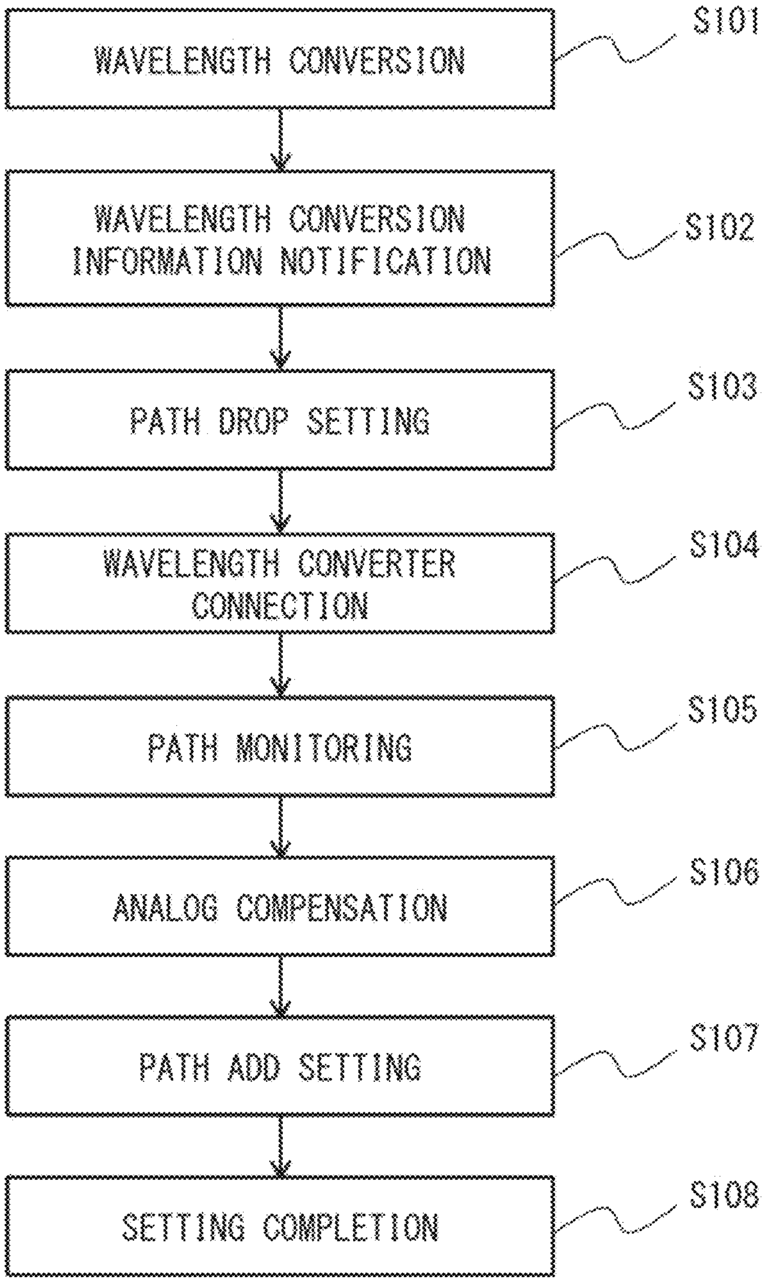
FIG. 10 is a flowchart illustrating an operation example of the optical network system according to the first example embodiment.

Next, an operation of the present example embodiment is described with reference to FIG. 10 while referring to FIGS. 8 and 9. FIG. 10 is a flowchart illustrating an operation example of the optical network system according to the present example embodiment.

As illustrated in FIG. 10, first, the NMS 100 performs wavelength conversion of the path (S101). When a path request is issued, the NMS 100 refers to the path database 101, determines a path for which wavelength conversion is required, based on the wavelength resource and the usage state, and notifies the node 200 that performs wavelength conversion of the determined path information. For example, information identifying a path, a wavelength before conversion, a wavelength after conversion, and the like are notified. The node controller 207 of each node 200 controls the optical switch 202 and the O-A-O wavelength converter 211 to convert the wavelength of the relevant path, based on the information received from the NMS 100. When each node 200 performs wavelength conversion, the NMS 100 holds, in the wavelength conversion management database 102, path wavelength conversion information indicating that each node 200 has performed wavelength conversion in the path.

Next, the NMS 100 notifies the wavelength conversion information of all the paths (S102). When the wavelength conversion and update of the wavelength conversion management database 102 are completed, the NMS 100 refers to the wavelength conversion management database 102 and notifies the node controllers 207 of all the nodes 200 of the wavelength conversion information about all the wavelength-converted paths.

Then, each node 200 performs drop setting of the path (S103). Upon receiving the wavelength conversion information about all the paths from the NMS 100 at each node 200, the node controller 207 determines a path (wavelength) to drop, based on the wavelength conversion information about all the paths. A path to be dropped is a path being a target of monitoring (analog compensation candidate). Specifically, a path in which another node 200 has performed the wavelength conversion in the route prior to the own node (before the own node) is extracted from the path wavelength conversion information, and the optical switch 202 is set so as to drop all the extracted paths (wavelengths).

Then, each node 200 connects the wavelength switch 204*a* to the O-A-O wavelength converter 211 (S104). At each node 200, the node controller 207 sets the wavelength switch 204*a* in such a way that the paths (wavelengths) which are set to drop, that is, all the paths wavelength-converted in the route before the own node, are connected to the post-demultiplexing O-A-O wavelength converter 211.

Then, each node 200 monitors the path (S105). At each node 200, the optical path monitor 206 connected to the tap coupler 205 monitors qualities of the paths (wavelengths) which are set to drop, that is, all the paths wavelength-converted in the route before the own node.

Then, each node 200 performs analog compensation, based on a path monitoring result (S106). At each node 200, the node controller 207 determines whether the monitored path quality exceeds a predetermined deterioration threshold. When there is a path exceeding the deterioration threshold, analog compensation (or wavelength conversion and analog compensation) is performed in the O-A-O wavelength converter 211 to which the path exceeding the deterioration threshold is connected. That is, the O-A-O wavelength converter 211 performs analog compensation for a path the quality of which is deteriorated more than a predetermined threshold, and the O-A-O wavelength converter 211 does not perform analog compensation for a path the quality of which is not deteriorated more than a predetermined threshold. Note that the analog compensation amount may be adjusted according to the deterioration amount of the quality of the path.

Then, each node 200 performs add setting of the path (S107), and completes the operation (setting) (S108). At each node 200, when the analog compensation is performed in response to the monitoring result, the node controller 207 sets the optical switch 202 and the wavelength switch 204*b* in such a way that the dropped path (wavelength), that is, the path where the analog compensation is performed in response to the monitoring result, is added to the original fiber. Note that the same operation is also performed in a node 200 in the subsequent stage.

As described above, in the present example embodiment, in the all-photonics network using O-A-O wavelength conversion, the NMS refers to the path database that manages the wavelength resource and the usage state in the NMS, notifies the node of the path information that requires the wavelength conversion, performs wavelength conversion, and holds data in the wavelength conversion management database. The NMS refers to the wavelength conversion management database and notifies the node controllers of all the nodes of the wavelength conversion information about all the wavelength-converted paths. At each node, all the paths that have been wavelength-converted in the route before the own node are dropped, and the signal quality is monitored. Each node performs analog compensation (or wavelength conversion and analog compensation) in the O-A-O wavelength converter for a path that exceeds a predetermined deterioration threshold, based on the monitor information. Thus, it is possible to ensure the arrival of the path by monitoring the signal quality of the wavelength-converted path and performing analog compensation according to the deterioration state.

Second Example Embodiment

Next, a second example embodiment is described. In the present example embodiment, an example in which an NMS determines a path for performing analog compensation is described.

<System Configuration>

Figure 11:
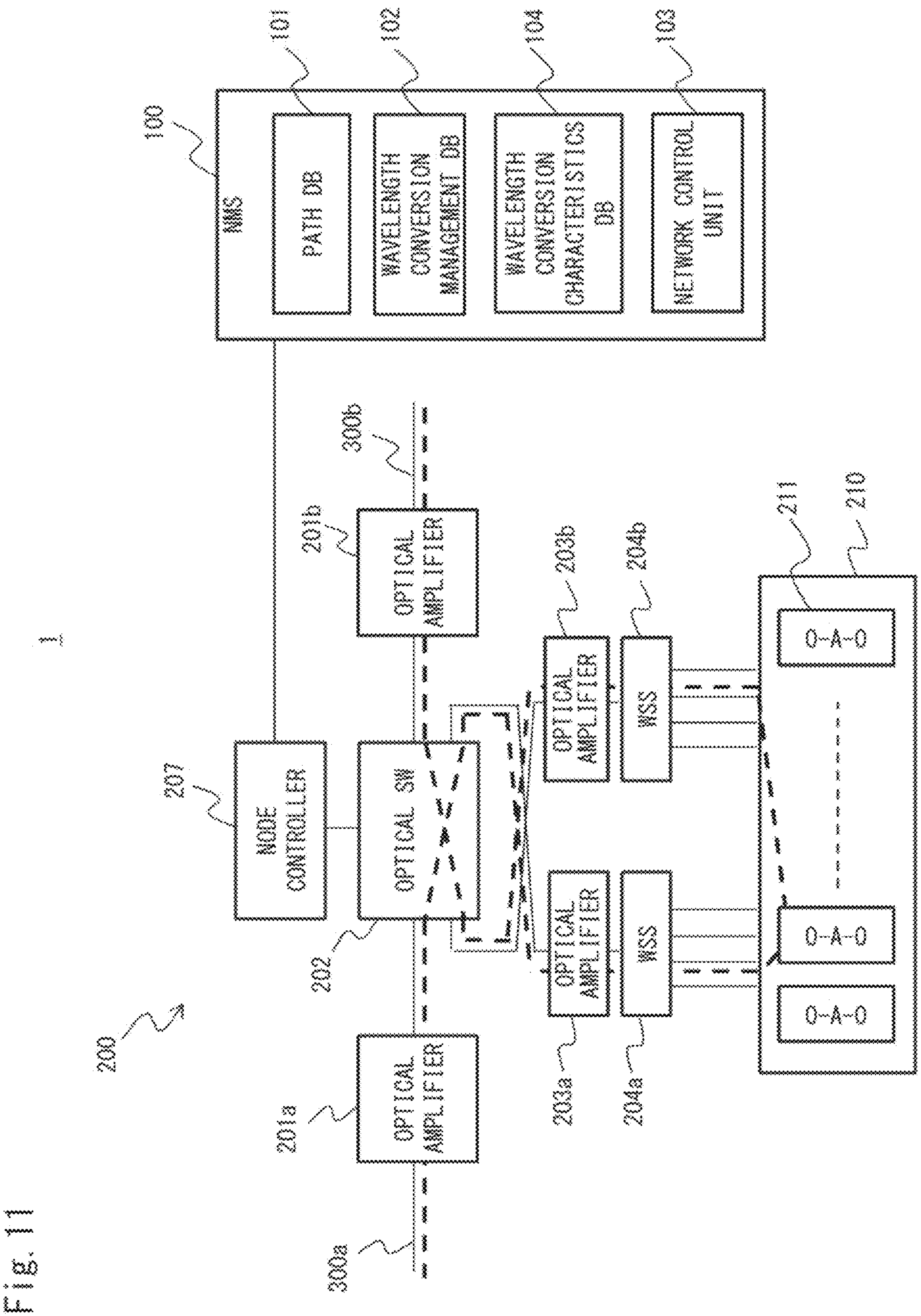
FIG. 11 is a functional block diagram illustrating a configuration example of each apparatus in an optical network system according to a second example embodiment.

First, a configuration of the present example embodiment is described with reference to FIG. 11. FIG. 11 illustrates a configuration example of each apparatus in an optical network system according to the present example embodiment. Herein, only differences from the configuration in the first example embodiment is described, and description of the same configuration will be omitted.

In the present example embodiment, the signal quality of the path is not monitored at each node 200. Therefore, in the node 200, the tap coupler 205 and the optical path monitor 206 in the first example embodiment are omitted.

Further, an NMS 100 includes a wavelength conversion characteristics database 104 (DB) in addition to the configuration of the first example embodiment. The wavelength conversion characteristics database 104 holds wavelength conversion characteristics information indicating wavelength conversion characteristics of a path. The wavelength conversion characteristics information includes a transmission distance (A) before wavelength conversion, a transmission distance (B) after wavelength conversion, an estimated signal deterioration degree (C), and an analog compensation (band re-compensation) node number (D). The wavelength conversion characteristics information preferably includes all of the transmission distance (A) before wavelength conversion, the transmission distance (B) after wavelength conversion, the estimated signal deterioration degree (C), and the analog compensation node number (D), but may include at least any of such information. For example, the estimated signal deterioration degree (C) and the analog compensation node number (D) may be included.

The transmission distance (A) before wavelength conversion is a transmission distance (for example, the number of hops) from a transmission end to a node where the wavelength conversion is performed in the path. The transmission distance (B) after wavelength conversion is a transmission distance from a node that performs the wavelength conversion to a reception end in the path. The estimated signal deterioration degree (C) is a deterioration degree of an optical signal estimated in the path. The deterioration degree is a deterioration degree of an optical signal received at the reception end relative to an optical signal transmitted from the transmission end. For example, the deterioration degree may be estimated from the transmission distance (A) before wavelength conversion and the transmission distance (B) after wavelength conversion. The analog compensation node number (D) is a number (identification information) of a node that performs analog compensation in the path. The wavelength conversion characteristics information stored in the wavelength conversion characteristics database 104 may be set, based on the wavelength conversion information about the path stored in a wavelength conversion management database 102. Further, the wavelength conversion characteristics information is map information acquired by mapping each piece of information. Specifically, a route of a path is illustrated on a network map indicating a connection relationship between each node in the network, and the transmission distance (A) before wavelength conversion, the transmission distance (B) after wavelength conversion, the estimated signal deterioration degree (C), and the analog compensation node number (D) are illustrated for each path.

<System Operation>

Figure 12:
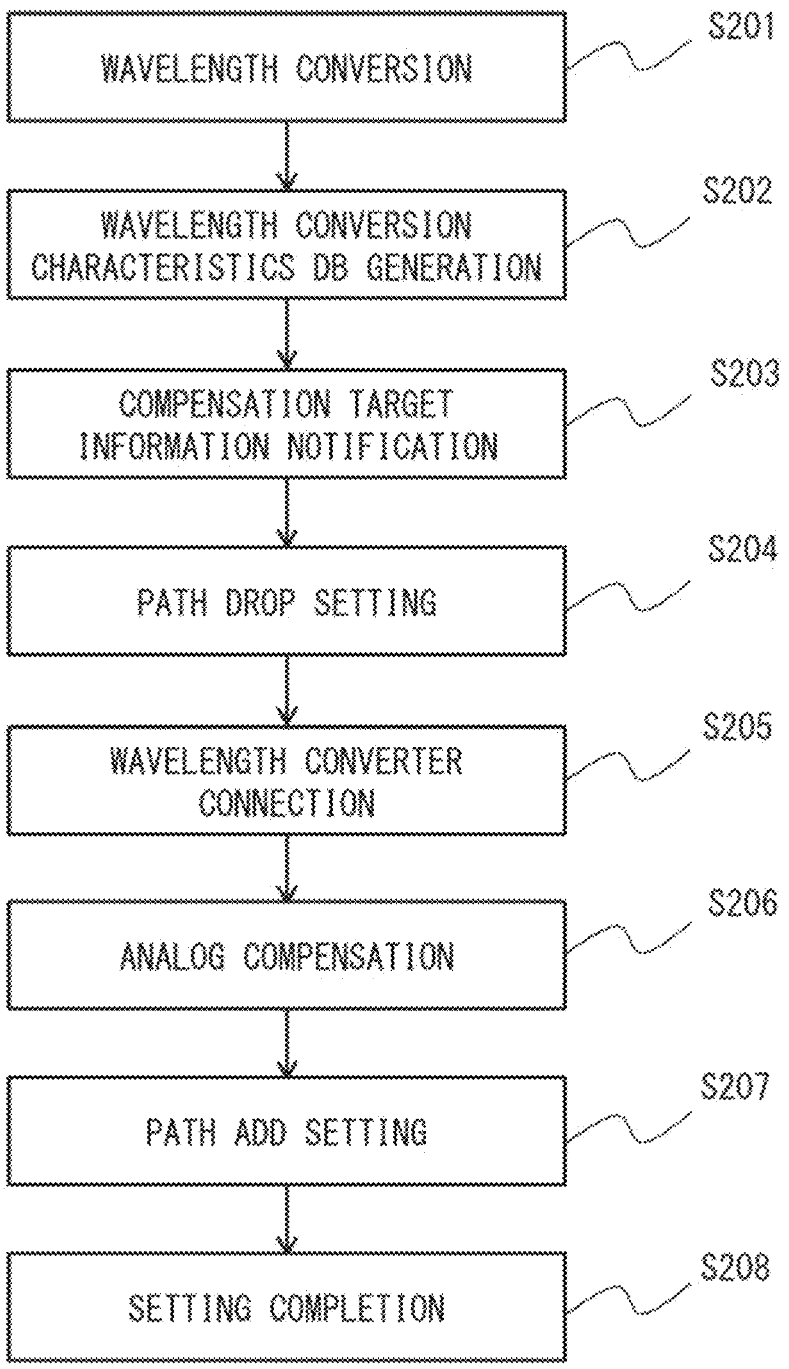
FIG. 12 is a flowchart illustrating an operation example of the optical network system according to the second example embodiment.

Next, an operation of the present example embodiment is described with reference to FIG. 12 while referring to FIGS. 6 and 11. FIG. 12 is a flowchart illustrating an operation example of the optical network system according to the present example embodiment.

As illustrated in FIG. 12, first, the NMS 100 performs wavelength conversion of the path (S201). Similarly to the first example embodiment, when a path request is issued, the NMS 100 refers to the path database 101 that manages a wavelength resource and a usage state, notifies the node 200 of the information about a path that requires wavelength conversion, performs wavelength conversion, and holds the path wavelength conversion information about the path in the wavelength conversion management database 102.

Next, the NMS 100 generates the wavelength conversion characteristics database 104 (S202). By generating the wavelength conversion characteristics database 104, the NMS 100 selects a path that is assumed to be deteriorated in advance. Specifically, map information (wavelength conversion characteristics information) acquired by mapping the transmission distance (A) before wavelength conversion, the transmission distance (B) after wavelength conversion, the estimated signal deterioration degree (C), and the analog compensation node number (D) is generated, and the map information is held in the wavelength conversion characteristics database 104. For example, for each path, the transmission distance (A) before wavelength conversion and the transmission distance (B) after wavelength conversion are acquired from the wavelength conversion information (route and wavelength conversion node) of the path, and the estimated signal deterioration degree (C) is acquired from the transmission distance (A) before wavelength conversion and the transmission distance (B) after wavelength conversion. A node for performing analog compensation is selected from nodes capable of analog compensation on the path, and the analog compensation node number (D) is determined. The NMS 100 refers to the wavelength conversion characteristics database 104 and determines a candidate path for performing analog compensation according to the map information. For example, the path to be subjected to analog compensation is determined, based on the estimated signal deterioration degree (C) of the path.

As a specific example, in a case where the number of hops to guarantee reachability is 10, and path 1 (A=1, B=9, C=5, D=8) and path 2 (A=7, B=3, C=6, D=9) are used, when a path having C=5 or more is to be subjected to analog compensation, path 1 and path 2 are determined to be subjected to analog compensation.

Then, the NMS 100 notifies of information about the path to be subjected to analog compensation (S203). The NMS 100 notifies the node 200 that performs analog compensation of wavelength conversion information (the wavelength conversion management database 102) about the path determined to be subjected to analog compensation and the wavelength conversion characteristics information (the wavelength conversion characteristics database 104) of the path. In the above-described specific example, since the analog compensation node number (D) of path 1 is 8, the information about path 1 is notified to a node 200 having a node number 8, and since the analog compensation node number (D) of path 2 is 9, the information about path 2 is notified to a node 200 having a node number 9.

Then, the notified node 200 performs drop setting of the path (S204). In the node 200, upon receiving the information about the path to be subjected to analog compensation from the NMS 100, a node controller 207 sets an optical switch 202 in such a way as to drop the notified path (wavelength) to be subjected to analog compensation.

Then, the node 200 connects a wavelength switch 204*a* to the O-A-O wavelength converter 211 (S205). At the node 200, the node controller 207 sets the wavelength switch 204*a* in such a way that the path to be subjected to analog compensation, which is set to drop, is connected to a post-demultiplexing O-A-O wavelength converter 211.

Then, the node 200 performs analog compensation on a relevant path (S206). At the node 200, analog compensation (or wavelength conversion and analog compensation) is performed, by the O-A-O wavelength converter 211, on the relevant path connected to the O-A-O wavelength converter 211.

Then, the node 200 performs add setting of the path (S207), and completes the operation (setting) (S208). In the node 200, when analog compensation is performed on the path to be subjected to analog compensation, the node controller 207 sets the optical switch 202 and a wavelength switch 204*b* in such a way that the dropped path (wavelength) is added to the original fiber. Note that the present operation is performed only by the node 200 that has received the notification from the NMS 100.

As described above, in the present example embodiment, as a different method for performing analog compensation in an all-photonics network using O-A-O wavelength conversion, a wavelength conversion characteristics database in which a transmission distance before wavelength conversion, a transmission distance after wavelength conversion, an estimated signal deterioration degree, and an analog compensation node number are mapped is generated and held, candidates for a path for performing analog compensation are determined according to the map, and analog compensation is performed only for a relevant path. By calculating the signal quality of the wavelength-converted path in advance and performing analog compensation according to the deterioration state as described above, it is possible to guarantee the arrival of the path.

Third Example Embodiment

Next, a third example embodiment is described. Since the configuration in the present example embodiment may be either of the configuration of the first example embodiment or the configuration of the second example embodiment, description of the configuration will be omitted.

<System Operation>

Figure 13:
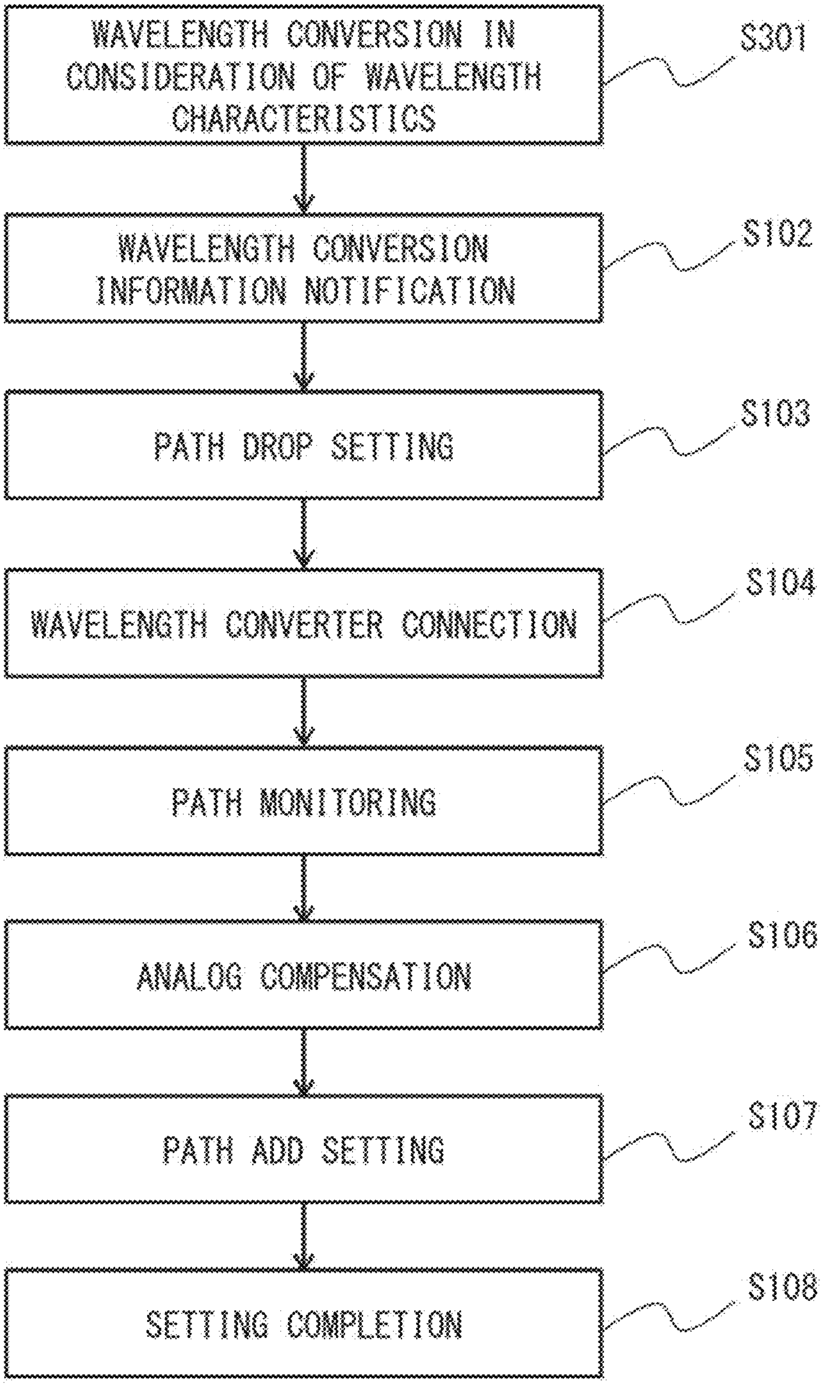
FIG. 13 is a flowchart illustrating an operation example of an optical network system according to a third example embodiment.
Figure 14:
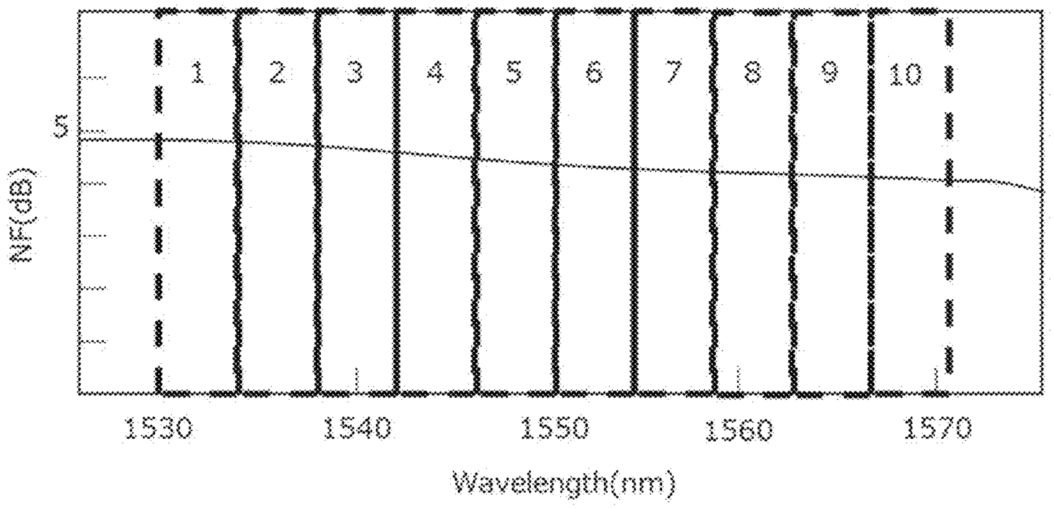
FIG. 14 is a diagram illustrating a relationship between an NF characteristic and a wavelength according to the third example embodiment.

Next, an operation of the present example embodiment is described with reference to FIGS. 13 and 14 while referring to FIGS. 8 and 9. FIG. 13 is a flowchart illustrating an operation of an optical network system according to the present example embodiment.

As illustrated in FIG. 13, first, an NMS 100 performs wavelength conversion of a path in consideration of wavelength characteristics (S301). When a path request is issued, the NMS 100 refers to a path database 101 that manages a wavelength resource and a usage state, notifies a node 200 of information about a path that requires wavelength conversion, performs wavelength conversion, and holds the wavelength conversion information about the path in a wavelength conversion management database 102.

At this time, the NMS 100 performs wavelength conversion in consideration of the wavelength characteristics of apparatuses within the network. For example, the wavelength characteristic is an NF characteristic or the like of an optical amplifier mounted on the node 200. The NF characteristic of an optical amplifier is characterized in that the short wavelength side is inferior to the long wavelength side. FIG. 14 is a conceptual diagram illustrating an NF characteristic and an algorithm for wavelength allocation. For example, the entire wavelength band is divided into 10, and wavelength conversion is performed, based on a wavelength band, in such a way that the NF characteristics are averaged. In one example, at the node 200, the NF characteristics may be averaged by controlling wavelength band 1 to be converted to wavelength band 10, wavelength band 4 to be converted to wavelength band 5, and the like. That is, the wavelength is converted between wavelength bands in which an amount of decrease (amount of deterioration) from an average value and an amount of increase (amount of improvement) from the average value are the same value (i.e., the absolute value is equal). Since operations of S102 and subsequent steps are the same as the operations in the first example embodiment, the description thereof is omitted.

As described above, in the present example embodiment, the wavelength conversion may be performed in consideration of the wavelength characteristics of the devices in the network. For example, the entire wavelength band may be divided into a plurality of sections and the wavelength conversion may be performed in such a way that NF characteristics are averaged. As described above, by performing wavelength conversion in consideration of characteristics such as an NF, it is possible to uniformize the quality of the path and reduce the paths requiring analog compensation.

The present disclosure is not limited to the above-described example embodiments, and may be appropriately modified without departing from the scope of the present disclosure.

Figure 15:
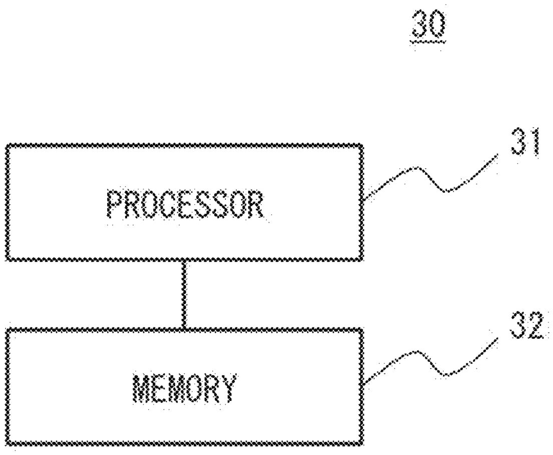
FIG. 15 is a configuration diagram illustrating an outline of hardware of a computer according to the example embodiments.

Each configuration in the above-described example embodiments is configured by hardware or software, or both, and may be configured by one piece of hardware or software, or may be configured by a plurality of pieces of hardware or software. Each device and each function (processing) may be achieved by a computer 30 including a processor 31 such as a central processing unit (CPU) and a memory 32 being a storage device, as illustrated in FIG. 15. For example, a program for performing the method (management method or control method) according to the example embodiments may be stored in the memory 32, and each function may be implemented by executing the program stored in the memory 32 by the processor 31.

Such programs include instructions (or software codes) that, when loaded into a computer, cause the computer to perform one or more of the functions described in the example embodiments. The programs may be stored in a non-transitory computer-readable medium or a tangible storage medium. By way of example, and not limitation, the computer-readable media or the tangible storage media include a random-access memory (RAM), a read-only memory (ROM), a flash memory, a solid-state drive (SSD) or other memory techniques, a CD-ROM, a digital versatile disc (DVD), a Blu-ray (registered trademark) disk or other optical disk storages, a magnetic cassette, a magnetic tape, a magnetic disk storage or other magnetic storage devices. The program may be transmitted on a transitory computer readable medium or a communication medium. By way of example, and not limitation, the transitory computer-readable media or the communication media include electrical, optical, acoustic, or other forms of propagated signals.

Although the present disclosure has been described with reference to the example embodiments, the present disclosure is not limited to the above-described example embodiments. Various changes that can be understood by a person skilled in the art within the scope of the present disclosure can be made to the configuration and details of the present disclosure.

Some or all of the above-described example embodiments may be described as the following supplementary notes, but are not limited thereto.

(Supplementary Note 1)

A management apparatus including:

- a path management means for managing a wavelength resource that can be used in a path of an all-photonics network provided with an optical node apparatus configured to perform wavelength conversion through optical-analog-optical conversion and a usage state of the wavelength resource;
- a wavelength conversion management means for managing path wavelength conversion information including wavelength conversion at the optical node apparatus constituting the path; and
- a control means for controlling wavelength conversion at the optical node apparatus, based on the managed wavelength resource and usage state, and controlling analog compensation at the optical node apparatus, based on the managed path wavelength conversion information.

(Supplementary Note 2)

The management apparatus according to supplementary note 1, wherein the control means notifies the optical node apparatus of the path wavelength conversion information, and thereby controls the optical node apparatus in the path in such a way as to perform analog compensation on all paths that are wavelength-converted in a route before the optical node apparatus.

(Supplementary Note 3)

The management apparatus according to supplementary note 1, further including a wavelength conversion characteristics management means for managing wavelength conversion characteristics information indicating wavelength conversion characteristics of the path,

- wherein the control means determines a candidate for a path for performing analog compensation, based on the wavelength conversion characteristics information, and controls the optical node apparatus in such a way as to perform analog compensation on the determined path.

(Supplementary Note 4)

The management apparatus according to supplementary note 3, wherein the wavelength conversion characteristics information includes a transmission distance before wavelength conversion in the path, a transmission distance after wavelength conversion in the path, an estimated signal deterioration degree of the path, and identification information about a node that performs analog compensation on the path.

(Supplementary Note 5)

The management apparatus according to any one of supplementary notes 1 to 4, wherein the control means divides an entire wavelength band into a plurality of sections, and controls the wavelength conversion in such a way that a noise figure (NF) characteristic is averaged.

(Supplementary Note 6)

An optical node apparatus constituting an all-photonics network, including:

- an optical reception means for receiving an optical signal;
- a wavelength conversion means for performing wavelength conversion on the received optical signal through optical-analog-optical conversion;
- an optical transmission means for transmitting the wavelength-converted optical signal; and
- a node control means for controlling the wavelength conversion means in such a way as to perform wavelength conversion and analog compensation in response to a notification from a management apparatus managing the all-photonics network.

(Supplementary Note 7)

The optical node apparatus according to supplementary note 6, further including a monitoring means for monitoring an optical signal being input to the wavelength conversion means,

- wherein the node control means performs control in such a way that the monitoring means monitors all paths that include the optical node apparatus and that are wavelength-converted in a route before the optical node apparatus, based on the path wavelength conversion information being notified from the management apparatus, and analog compensation is performed based on a result of the monitoring.

(Supplementary Note 8)

The optical node apparatus according to supplementary note 7, wherein the node control means performs control in such a way that analog compensation is performed on a path, among the monitored paths, quality of which has deteriorated to below a predetermined threshold.

(Supplementary Note 9)

The optical node apparatus according to supplementary note 6, wherein the node control means performs control in such a way that analog compensation is performed on a relevant path, based on information about a path to be subjected to analog compensation notified from the management apparatus.

(Supplementary Note 10)

An optical network system including:

- an all-photonics network provided with an optical node apparatus configured to perform wavelength conversion through optical-analog-optical conversion; and
- a management apparatus configured to manage the all-photonics network, wherein
  - the management apparatus includes
    - a path management means for managing a wavelength resource that can be used in a path of the all-photonics network and a usage state of the wavelength resource,
    - a wavelength conversion management means for managing path wavelength conversion information including wavelength conversion at the optical node apparatus constituting the path, and
    - a control means for controlling wavelength conversion at the optical node apparatus, based on the managed wavelength resource and usage state, and controlling analog compensation at the optical node apparatus, based on the managed path wavelength conversion information.

(Supplementary Note 11)

A control method including:

managing a wavelength resource that can be used in a path of an all-photonics network provided with an optical node apparatus configured to perform wavelength conversion through optical-analog-optical conversion and a usage state of the wavelength resource;

managing path wavelength conversion information including a wavelength conversion at the optical node apparatus constituting the path; and controlling wavelength conversion at the optical node apparatus, based on the managed wavelength resource and usage state, and controlling analog compensation at the optical node apparatus, based on the managed path wavelength conversion information.

(Supplementary Note 12)

A non-transitory computer-readable medium storing a control program for causing a computer to execute processing of:

managing a wavelength resource that can be used in a path of an all-photonics network provided with an optical node apparatus configured to perform wavelength conversion through optical-analog-optical conversion and a usage state of the wavelength resource;

managing path wavelength conversion information including wavelength conversion at the optical node apparatus constituting the path; and controlling wavelength conversion at the optical node apparatus, based on the managed wavelength resource and usage state, and controlling analog compensation at the optical node apparatus, based on the managed path wavelength conversion information.

(Supplementary Note 13)

A path control scheme for an all-photonics network using analog wavelength conversion for performing wavelength conversion by directly connecting an analog signal output of an optical receiver to an analog signal input of an optical transmitter, wherein an NMS includes a path database configured to manage wavelength resources and usage states, and a wavelength management database configured to manage wavelength conversion information, the path control scheme including performing wavelength conversion, based on the path database, and performing analog compensation with reference to the wavelength conversion management database.

(Supplementary Note 14)

The path control scheme according to supplementary note 13, further including, in a node on a communication path, monitoring all paths that are wavelength-converted in a route before the node, with reference to information in the wavelength conversion management base, and performing analog compensation, based on monitor information.

(Supplementary Note 15)

The path control scheme according to supplementary note 13, wherein the NMS includes a wavelength conversion characteristics database holding a transmission distance before wavelength conversion, a transmission distance after wavelength conversion, an estimated signal deterioration degree, and an analog compensation node number, the path control scheme further including determining a candidate for a path for performing analog compensation, by referring to the wavelength conversion characteristics database, and performing analog compensation only on the determined path.

(Supplementary Note 16)

The path control scheme according to supplementary note 13 or 14, including dividing the entire wavelength band into a plurality of sections, and performing the wavelength conversion in such a way that NF characteristics are averaged.

(Supplementary Note 17)

A network management system including the path control scheme according to supplementary note 13.

(Supplementary Note 18)

An optical network apparatus including the path control scheme according to supplementary note 13.

(Supplementary Note 19)

An optical network control program including the path control scheme according to supplementary note 13.

REFERENCE SIGNS LIST

1 OPTICAL NETWORK SYSTEM
2 ALL-PHOTONICS NETWORK
10 MANAGEMENT APPARATUS
11 PATH MANAGEMENT UNIT
12 WAVELENGTH CONVERSION MANAGEMENT UNIT
13 CONTROL UNIT
20 NODE
21 OPTICAL RECEPTION UNIT
22 WAVELENGTH CONVERSION UNIT
23 OPTICAL TRANSMISSION UNIT
24 NODE CONTROL UNIT
30 COMPUTER
31 PROCESSOR
32 MEMORY
100 NMS
10 PATH DATABASE
102 WAVELENGTH CONVERSION MANAGEMENT DATABASE
103 NETWORK CONTROL UNIT
104 WAVELENGTH CONVERSION CHARACTERISTICS DATABASE
200 NODE
201 TRANSMISSION LOSS COMPENSATION OPTICAL AMPLIFIER
202 OPTICAL SWITCH
203 NODE LOSS COMPENSATION OPTICAL AMPLIFIER
204 WAVELENGTH SELECTIVE SWITCH
205 TAP COUPLER
206 OPTICAL PATH MONITOR
207 NODE CONTROLLER
210 ANALOG WAVELENGTH CONVERTER POOL
211 O-A-O WAVELENGTH CONVERTER
300 OPTICAL TRANSMISSION LINE
300*a*, 300*b* OPTICAL FIBER

What is claimed is:

1. A management apparatus connected to an optical node apparatus that is on a path of a photonics network and is configured to perform wavelength conversion through optical-analog-optical conversion, the management apparatus comprising:

a path database storing wavelength resource information on a wavelength that can be used in the path of the photonics network and usage state information on a usage state of the wavelength;

a wavelength conversion management database storing path wavelength conversion information including wavelength conversion at the optical node apparatus on the path; and a network controller configured to control wavelength conversion at the optical node apparatus, based on the stored wavelength resource information and usage state information, and control analog compensation at the optical node apparatus, based on the stored path wavelength conversion information.

2. The management apparatus according to claim 1, wherein the network controller is further configured to notify the optical node apparatus of the path wavelength conversion information, and thereby control the optical node apparatus on the path in such a way as to perform analog compensation on all paths that are wavelength-converted in a route before the optical node apparatus.

3. The management apparatus according to claim 1, further comprising a wavelength conversion characteristics database storing wavelength conversion characteristics information indicating wavelength conversion characteristics of the path, wherein the network controller is further configured to determine a candidate for a path for performing analog compensation, based on the wavelength conversion characteristics information, and control the optical node apparatus in such a way as to perform analog compensation on the determined path.

4. The management apparatus according to claim 3, wherein the wavelength conversion characteristics information includes a transmission distance before wavelength conversion on the path, a transmission distance after wavelength conversion on the path, an estimated signal deterioration degree of the path, and identification information about a node that performs analog compensation on the path.

5. The management apparatus according to claim 1, wherein the network controller is further configured to divide an entire wavelength band into a plurality of sections, and control the wavelength conversion in such a way that a noise figure (NF) characteristic is averaged.

6. An optical node apparatus on a path of a photonics network, the optical node apparatus comprising:

an optical switch connected to a second optical node apparatus and configured to receive an optical signal;

a wavelength convertor configured to perform wavelength conversion on the optical signal received by the optical switch through optical-analog-optical conversion, wherein the optical switch is further configured to transmit the wavelength-converted optical signal; and a node controller configured to control the wavelength convertor to perform wavelength conversion and analog compensation in response to a notification from an external management apparatus.

7. The optical node apparatus according to claim 6, further comprising a monitor configured to monitor an optical signal being input to the wavelength convertor, wherein the node controller is further configured to control the monitor to monitor all paths that include the optical node apparatus and that are wavelength-converted in a route before the optical node apparatus, based on path wavelength conversion information being notified from the external management apparatus, and perform control to cause analog compensation to be performed based on a result of the monitoring.

8. The optical node apparatus according to claim 7, wherein the node controller is further configured to perform control to cause analog compensation to be performed on a path, among the monitored paths, having a quality that has deteriorated to below a predetermined threshold.

9. The optical node apparatus according to claim 6, wherein the node controller is further configured to perform control to cause analog compensation to be performed on a path, based on information about a path to be subjected to analog compensation notified from the external management apparatus.

10. An optical network system comprising:

a photonics network provided with an optical node apparatus configured to perform wavelength conversion through optical-analog-optical conversion, the optical node apparatus being on a path in the photonics network; and a management apparatus configured to manage the photonics network, wherein the management apparatus includes a path database storing wavelength resource information on a wavelength that can be used in the path of the photonics network and usage state information on a usage state of the wavelength, a wavelength conversion management database storing path wavelength conversion information including wavelength conversion at the optical node apparatus on the path, and a network controller configured to control wavelength conversion at the optical node apparatus, based on the stored wavelength resource information and usage state information, and control analog compensation at the optical node apparatus, based on the stored path wavelength conversion information.

* * * * *